UNITED STATES PATENT OFFICE.

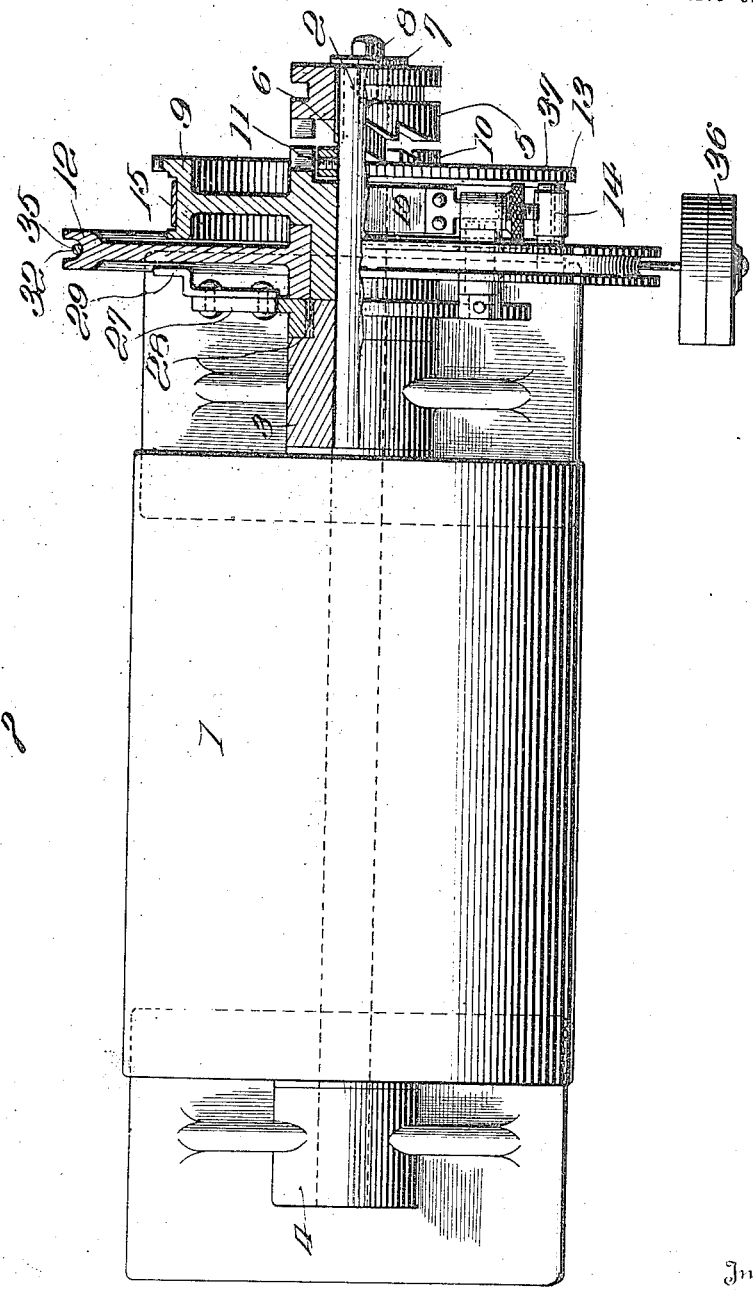

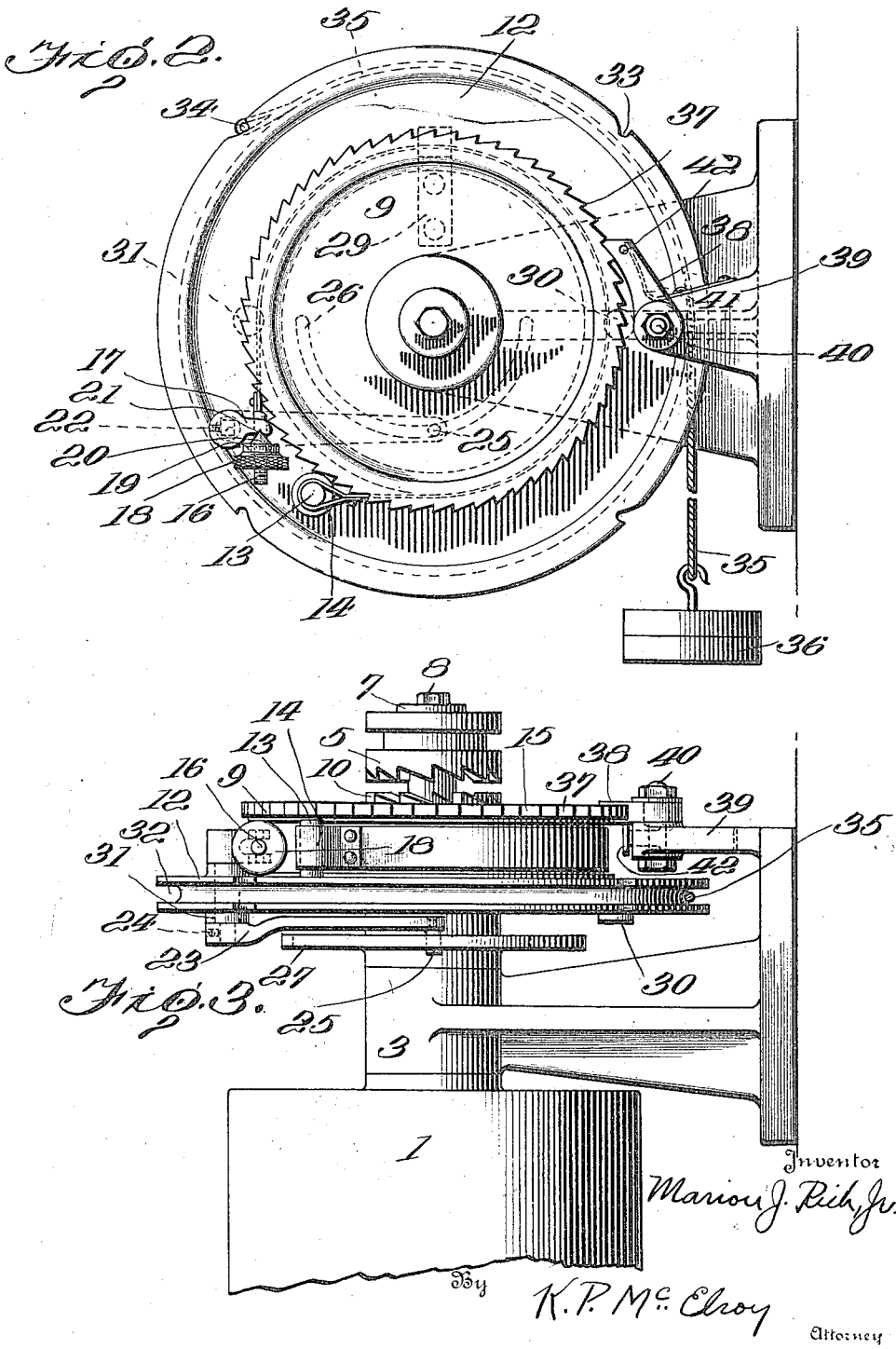

MARION J. RICH, JR., OF TRENTON, NEW JERSEY, ASSIGNOR TO EMPIRE RUBBER & TIRE COMPANY, OF TRENTON, NEW JERSEY, A CORPORATION OF NEW JERSEY.

TENSIONING DEVICE.

1,293,550.   Specification of Letters Patent.   Patented Feb. 4, 1919.

Application filed October 11, 1917. Serial No. 196,010.

*To all whom it may concern:*

Be it known that I, MARION J. RICH, Jr., a citizen of the United States, residing at Trenton, in the county of Mercer and State of New Jersey, have invented certain new and useful Improvements in Tensioning Devices, of which the following is a specification.

This invention relates to tensioning devices and it comprises a roll over which passes the fabric to be tensioned, a shaft on which the roll is mounted, the shaft being arranged in suitable bearings, a brake drum freely mounted on said shaft, means to cause said drum to revolve with the shaft, a sheave freely mounted on the hub of the brake drum, a brake band secured at one end to said sheave, said band being arranged to engage the periphery of the brake drum, a crank or arm mounted in the sheave and free to revolve, the opposite end of said brake band being secured to said crank, a cam lever secured to said crank to cause said crank to rotate, a cam plate fixedly secured to any suitable support such as one of the bearings of the shaft, said cam lever being in engagement with the cam plate and operated thereby; flexible means on the periphery of said sheave and depending therefrom, and a weight secured to said flexible means; all as more fully hereinafter set forth and as claimed.

In various arts where articles are made of fabric and the like, it is necessary to use some means for feeding the fabric to the machines at a uniform tension. The most common form of tension device employed is one comprising a brake band engaging the periphery of a brake wheel or pulley. This arrangement is open to several objections, one of which is the necessity of frequent adjustment due to wear on the brake band. Tensioning devices depending upon friction between the material and two or more surfaces between which the material passes, are not entirely satisfactory. An undue strain is placed on the material being fed through such tensioning devices. Another objection to this type of device is its dependence upon unvarying coefficient of friction between the fabric and the surfaces between which it is gripped. This is particularly objectionable where rubberized fabrics are used.

In the present method of applying tension I employ a weight, pulling in a direction opposite to that in which the fabric roll is revolved. The tension is constant, being in proportion to the weight for any given radius. The tension may be adjusted by changing the weight. The tension of the weight is balanced by an opposing torque of the brake band engaging the periphery of a brake drum. The end of the brake is secured to the sheave on which the weight is mounted and means are provided for automatically loosening or tightening the band when the sheave revolves. Wear on the brake band, or variations in friction between the band and the drum, have no effect on the operation of the machine, as the automatic adjusting means causes a balancing tension to be applied to the brake drum whenever the machine is operated.

In the present invention, I employ a fabric roll carried by a shaft, a brake drum loosely mounted on the shaft; clutch connecting means between the drum and the shaft, a sheave loosely mounted with respect to the drum and the shaft, a brake band having one end secured to the sheave, the brake band passing over the periphery of the drum, a crank carried by the sheave, the opposite end of the brake band being secured to the crank, a cam lever connected to the crank, a plate arranged upon the machine, a cam slot in the plate, the end of said lever riding in said cam slot, and a weight depending from said sheave.

In the accompanying drawings, I have shown an advantageous embodiment of the invention.

In this showing—

Figure 1 is a front elevation, certain of the parts being shown in cross-section;

Fig. 2 is a side elevation of the construction shown in Fig. 1, and

Fig. 3 is a bottom plan view of one end of the roll showing the tensioning device applied thereto.

The tension device comprises a roll 1 mounted upon a shaft 2, supported in bearings 3 and 4. A jaw clutch 5 is keyed upon one end of the shaft by means of a key 6. The clutch is permitted to move longitudinally and retained on the shaft by means of a washer 7 and nut 8. A brake drum 9, bored to fit the shaft, is mounted on the shaft, and is provided with a mating jaw clutch 10 which is secured in position by a set collar 11. The hub of the brake drum forms a seat for sheave 12 which is bored to a running fit on said hub. A stud 13 projects from the side of the sheave and receives a loop 14 upon the end of the brake band 15. A threaded stud 16 is suitably fastened to the opposite end of the brake band. The threaded stud passes between two jaws of an adjusting crank 17 and is held in adjusted position by means of a nut 18 and washer 19. One face of the washer is provided with a V-shaped projection 20 which is received in notches 21 of the crank. A pin 22, integral with or secured to the crank passes through the sheave and turns freely therein. The end of the pin is squared to fit into a square hole in one end of the cam lever 23. The cam lever is secured to said pin by a set screw 24. A follower pin 25, carried upon the opposite end of the cam lever, rides in a groove 26 in cam plate 27. The cam plate fits over a shoulder on bearing (3). A key 28 prevents the cam plate from turning. The cam plate is provided with a stop arm 29 extending close to the face of the sheave. Bosses 30 and 31 limit the movement of the sheave by means of the stop arm.

The sheave is provided with a peripheral groove 32 and a plurality of transverse notches 33 (four of such notches being shown in the drawings). A pin 34 is arranged in one end of a rope or cord 35. Weight 36 is carried upon the opposite end of the rope or cord. The brake drum is provided with ratchet teeth 37 upon one edge, which are adapted to be engaged by pawl 38. The pawl is pivoted on a bracket 39 by means of a stud 40. Spring 41, secured to the bracket, bears against pin 42 projecting from the pawl, pressing the pawl against the ratchet.

The operation of this device is as follows:—

The cloth to be tensioned is wrapped around roll 1 with the clutch disengaged until the operator desires to apply the tension. The clutch 5 is then moved into engagement with the mating clutch 10 which will cause the brake drum 9 to revolve with the roll. The brake band 15 being fastened to sheave 12 causes the sheave to revolve in a counter-clockwise direction (see Fig. 2) against the tension produced by weight 36. As the sheave revolves the pin 25 rides in the cam slot 26 turning crank 17 loosening the brake band. This action continues until the torque due to friction between the brake band and the drum is just great enough to balance the opposing torque due to the weight pulling upon the sheave. When this happens the brake band will begin to slip upon the drum and the sheave will remain stationary. The band will continue to slip upon the drum and the sheave will remain in the same position applying a constant tension in the opposite direction as long as the fabric is being drawn around the roll 1. When the machine is stopped or the pull on the fabric is released, the weight causes the sheave to turn in a clockwise direction tightening the brake band. This movement however is limited to an arc less than that represented by one tooth of the ratchet, as the pawl drops into the nearest tooth and brings the weight to rest. The weight continues to exert a constant pull on the sheave but this is balanced or overcome by the pawl and ratchet. The clutch may be then disengaged and roll 1 turned in either direction until the tension is again desired. Upon reëngagement of the clutch the rotation of the shaft causes the brake drum to revolve, relieving the pressure on the pawl and reëstablishing the balanced friction caused by the brake band and the weight 36.

The torque which opposes rotation of the roll shaft is due to a weight pulling in a constant radius and is therefore proportional to the weight. This permits a constant and predetermined pull which may be varied to suit conditions. The nut is only employed to put an initial tension on the brake band to permit the cam lever to operate within its range. The arrangement of crank 17, and cam lever 23 automatically adjusts the brake band when in operation. As the brake band wears the nut may be adjusted to compensate for the wear. Bosses 30 and 31 engaging the stop arm 29 stop the sheave and prevent the pin 25 from traveling to the ends of the cam slot 26. This eliminates any possibility of undue shock or jar which would be caused if the follower pin for any reason should ride to the end of the slot, and be suddenly stopped upon contact with the end wall of the slot.

An important feature of the device is its ability to automatically compensate for varying coefficient of friction between the brake band and the drum, due to wear, temperature, humidity, or other causes.

What I claim is:—

1. A tension device comprising a shaft, a sheave freely mounted with respect to said shaft, a weight depending from the sheave, automatically adjustable means for revolving the sheave to lift the weight when the shaft is initially revolved, means for communicating the tension exerted by the depending weight to said shaft.

2. A tension device comprising a shaft, a sheave freely mounted with respect to said shaft, a weight depending from the sheave, combined means for revolving the sheave and for supplying torsion to the shaft opposing the torsion due to said weight, and means for automatically balancing said torsions.

3. A tension device comprising a shaft, means freely mounted on said shaft for applying a constant tension in one direction, and combined means connecting said first mentioned means to said shaft and applying a tension to said shaft to balance said first tension.

4. A tension device comprising a shaft, means for applying a constant tension in one direction, means for supplying a tension in the opposite direction, and means for automatically adjusting said second tension to balance said first tension, said second mentioned means connecting said first mentioned means to the shaft.

5. A tension device comprising a shaft, a brake drum mounted on said shaft, a sheave freely mounted with respect to said brake drum and shaft, a brake band frictionally engaging said brake drum, one end of said brake band being secured to said sheave, a crank carried by said sheave, the opposite end of said brake band being secured to said crank, a cam lever connected to said crank, a cam plate in which said lever travels, and a weight depending from said sheave.

6. A tension device comprising a shaft, a brake drum mounted on said shaft, a sheave freely mounted with respect to said brake drum and shaft, a brake band frictionally engaging said brake drum, and connected to said sheave, a weight depending from said sheave, and means for automatically adjusting said brake band.

7. A tension device comprising a shaft, a brake drum mounted on said shaft, a sheave freely mounted with respect to said brake drum and shaft, a brake band frictionally engaging said brake drum, one end of said brake band being secured to said sheave, a crank carried by said sheave, the opposite end of said brake band being secured to said crank, means for automatically revolving said crank, and thereby adjusting said brake band, and a weight depending from said sheave.

8. A tension device comprising a shaft, a brake drum mounted on said shaft, a sheave freely mounted with respect to said brake drum, one end of said brake drum being secured to said sheave, means for supplying variable torsion to said brake drum, means for supplying a constant torsion to said sheave, said torsion being exerted in an opposite direction from said variable torsion, and means for automatically adjusting said variable torsion to balance said constant torsion, said means being secured to the other end of said brake drum.

In testimony whereof, I affix my signature hereto.

MARION J. RICH, Jr.

Copies of this patent may be obtained for five cents each, by addressing the "Commissioner of Patents, Washington, D. C."